UNITED STATES PATENT OFFICE.

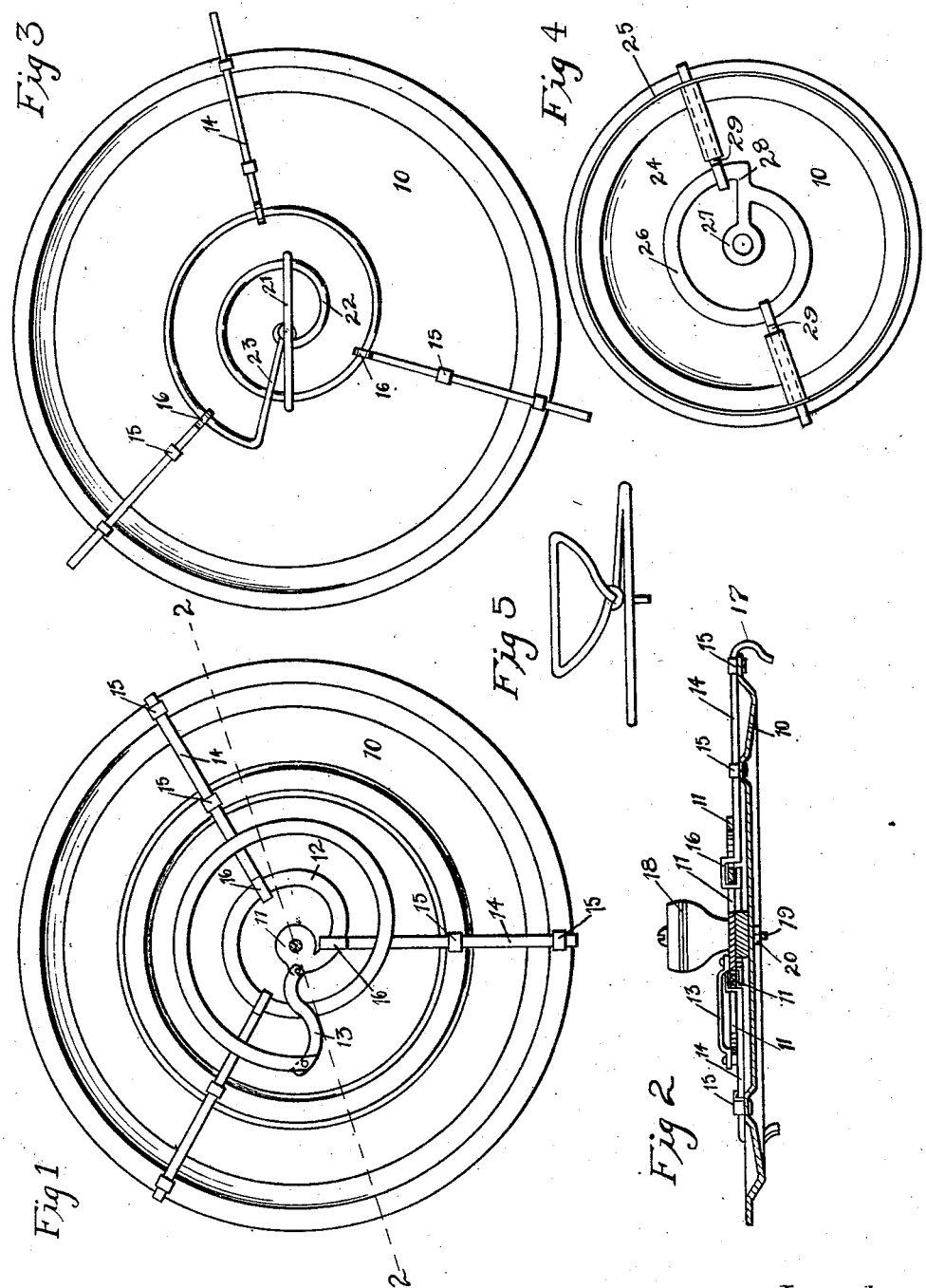

EBBE J. HANSEN, OF EXIRA, IOWA.

COVER FOR CULINARY VESSELS.

968,557.  Specification of Letters Patent.  Patented Aug. 30, 1910.

Application filed March 23, 1908. Serial No. 422,659.

*To all whom it may concern:*

Be it known that I, EBBE J. HANSEN, a citizen of the United States, residing at Exira, in the county of Audubon and State of Iowa, have invented a new and useful Cover for Culinary Vessels, of which the following is a specification.

The object of my invention is to provide a cover for culinary vessels, so arranged that it may be quickly and easily attached to a culinary vessel, and held firmly to the vessel to prevent the escape of steam, and also held to the vessel in such a manner that the vessel may be inverted and the cover firmly retained in position thereon.

More specifically it is my object to provide a device for clamping covers to vessels, which device may be quickly and easily operated to attach the cover to a vessel, or to release it therefrom, which device will be firmly locked in any position in which it is placed, so that the cover may be fitted and locked to vessels of various sizes and shapes.

My invention consists in the construction, arrangement and combination of the various parts of the device, whereby the objects contemplated are attained, as hereinafter more fully set forth, pointed out in my claim and illustrated in the accompanying drawings, in which—

Figure 1 shows a top or plan view of a cover provided with my improvements, the knob or handle of the cover being omitted. Fig. 2 shows a sectional view on the line 2—2 of Fig. 1. Fig. 3 shows a top or plan view illustrating a modified form of cover attaching device. Fig. 4 shows an inverted plan view of a cover having a modified form of my invention applied thereto, and—Fig. 5 shows a detail ide view illustrating the form of cam device shown in Fig. 3.

Referring to the accompanying drawings, I have used the reference numeral 10 to indicate the cover proper. This cover is of the ordinary construction now in common use.

Mounted on top of the cover is a cam device formed of a single piece of sheet metal, which may be cut out by dies, said cam device comprising a disk shaped central portion 11 and a spiral cam portion 12, all of which is arranged in the same horizontal plane. The outer end of the part 12 is connected with the part 11 by means of a bar 13, it being firmly riveted thereto so that the outer portion of the spiral is rigidly held in position relative to the other portions thereof.

Slidingly mounted on top of the cover 10 are three clamping bars 14. These bars are supported on the cover by means of loops 15 arranged to overlap the bars. Said loops are extended through the cover and their lower ends are bent parallel with the under surface of the cover, as shown in Fig. 2. Each of the bars 14 has at its inner end a loop 16 designed to encircle a part of the spiral 12. The outer end of each bar is provided with a hook 17 designed to fit over the edge of a culinary vessel, and to engage the rim, which is usually formed on the top edge of a culinary vessel. The disk shaped part 11 is held to the central portion of the cover by means of a knob 18 through which a bolt 19 is passed, which bolt extends through the disk shaped portion 11 and the cover 10, and is provided with a nut 20 on its lower end.

By means of the construction described, it is obvious that the operator may grasp the knob 18 and by turning it in one direction, he may cause the bars 14 to be extended outwardly and by turning it in the opposite direction, the bars 15 will be moved inwardly.

In operation, the bars are first moved to their outer limit, then the cover is placed on the vessel, and then the bars are moved inwardly until the hooks 17 engage the rim around the top of the vessel. On account of the spiral shape of the part 12, the bars will be firmly locked or secured against outward or inward movement in any position in which they may be placed. Hence when the hooks 17 are once placed in engagement with the rim of a vessel, the cover will be firmly and immovably held to the vessel until the knob 18 is rotated in the direction required for moving the hooks outwardly.

One of the important advantages of my device is that the hooks 17 may be locked or firmly held in position on vessels of different sizes, as it does not matter in what position they are placed, they are held by the spiral device 12 against spreading movement, hence the hooks will engage a small vessel and hold the cover just as firmly as on a large one.

In the modified form shown in Fig. 3, I have illustrated a spiral device in which the entire device is formed complete of a single piece of spring wire, and the handle is also formed of the same material. In this form of the invention, the wire is formed into a handle 21, a spiral portion 22, and a bar 23. One end of the wire is then extended through the cover and secured beneath the cover in any desirable way, so that the complete device is formed of a single piece of wire. One advantage with this form of the invention is that by making the spiral out of spring wire, it will yield slightly at any point where one of the bars 14 engage it, so that said bars will fit accurately on vessels that are not perfectly round, and the spring feature also provides for holding the cover to the vessel more firmly on account of said spring.

In the modified form shown in Fig. 4, I have shown a cover 24 provided with a downwardly projecting flange 25 designed to be placed inside of the vessel with which the cover is used. On the under side of the cover 24 is a spiral device 26 in which the central disk 27 and the bar 28 are all formed complete of a single piece of metal. In this form of the invention, only two slide bars 29 are shown, which are designed to project outwardly into the interior of the vessel on which the cover is used, and thus hold the cover to the vessel.

I claim as my invention.

A cover for culinary vessels comprising a body portion, a series of slide bars mounted in the body portion and capable of radial movement relative thereto, said bars having hooks at their outer ends, and loops at their inner ends, a knob rotatably mounted at the central portion of the cover body, a spiral cam device made of flat metal fixed at its inner end to the knob and comprising substantially two complete loops, said cam device being passed through the loops on the inner ends of the slide bars, and a brace riveted to the outer end of the cam device extended over the central portion thereof and also fixed to the inner end portion thereof, the center of said brace being spaced from the cam device.

Des Moines, Iowa, March 20, 1908.

EBBE J. HANSEN.

Witnesses:
M. E. BENNETT,
S. F. CHRISTY.